US011148216B1

(12) United States Patent
Carper

(10) Patent No.: US 11,148,216 B1
(45) Date of Patent: Oct. 19, 2021

(54) TABLE SAW DEPTH GAUGE

(71) Applicant: Robert Carper, Arab, AL (US)

(72) Inventor: Robert Carper, Arab, AL (US)

( * ) Notice: Subject to any disclaimer, the term of this patent is extended or adjusted under 35 U.S.C. 154(b) by 0 days.

(21) Appl. No.: 17/326,740

(22) Filed: May 21, 2021

(51) Int. Cl.
| *B23D 59/00* | (2006.01) |
| *B23D 47/02* | (2006.01) |
| *B23Q 17/22* | (2006.01) |
| *G01B 5/06* | (2006.01) |

(52) U.S. Cl.
CPC ......... *B23D 59/002* (2013.01); *B23D 47/025* (2013.01); *B23Q 17/2225* (2013.01); *G01B 5/061* (2013.01)

(58) Field of Classification Search
CPC .............. B23D 59/002; B23D 47/025; B23Q 17/2216; B23Q 17/2233; B23Q 17/2225
USPC ............................................. 33/640
See application file for complete search history.

(56) References Cited

U.S. PATENT DOCUMENTS

| 3,205,586 A | * | 9/1965 | Mullen | B23D 59/002 33/640 |
| 3,628,496 A | * | 12/1971 | Schmitt | B23Q 17/225 33/640 |
| 4,779,354 A | * | 10/1988 | Hill | B23D 59/002 33/403 |
| 5,168,637 A | * | 12/1992 | Gibson | B23D 59/001 33/628 |
| 5,491,906 A | * | 2/1996 | Reilly | B23D 59/00 33/471 |
| 6,434,852 B1 | * | 8/2002 | Tarris | B23Q 17/003 33/640 |
| 6,665,946 B1 | * | 12/2003 | Reilly | B23D 59/002 33/626 |
| 6,785,976 B1 | * | 9/2004 | Morehouse | B43L 7/005 33/418 |
| 7,013,574 B2 | | 3/2006 | Plunkett | |
| 7,861,428 B1 | * | 1/2011 | Clark | G01B 3/04 33/427 |
| 10,907,947 B2 | * | 2/2021 | Vuylsteke | G01B 3/04 |
| 2006/0185485 A1 | * | 8/2006 | Wang | B27C 5/06 83/436.2 |
| 2007/0056179 A1 | * | 3/2007 | Beall | G01C 9/06 33/640 |
| 2008/0229598 A1 | * | 9/2008 | Liu | G01B 3/20 33/562 |

* cited by examiner

*Primary Examiner* — Christopher W Fulton
(74) *Attorney, Agent, or Firm* — Cynthia R. Wright

(57) ABSTRACT

The Table Saw Depth Gauge comprises a gauge, slide scale, or ruler, that is positioned onto a table saw so that the depth that the saw blade will cut into a piece of wood, or board, can be measured by the gauge, slide scale, or ruler prior to cutting, allowing a user of the table saw to confirm saw blade depth prior to making a final cut. The device also comprises a handheld gauge holder that holds the gauge, slide scale, or ruler into place onto the table saw, securing the gauge into the opening of the table insert/throat plate of the table saw. The gauge may be moved relative to the handheld gauge holder to calculate saw blade depth.

4 Claims, 9 Drawing Sheets

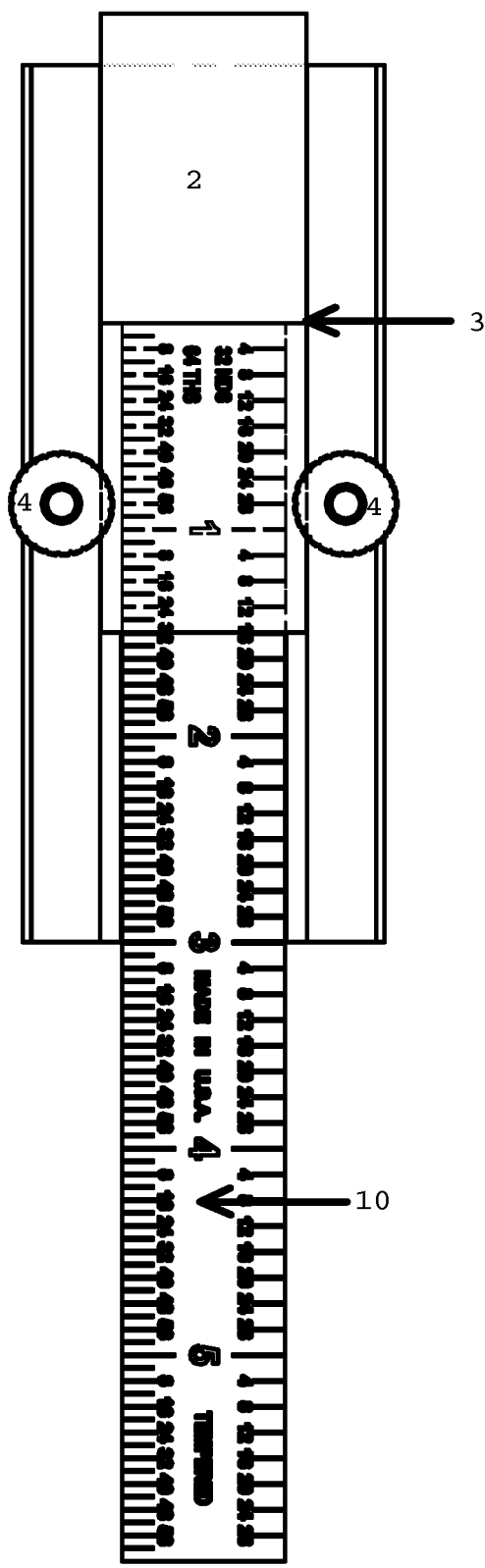 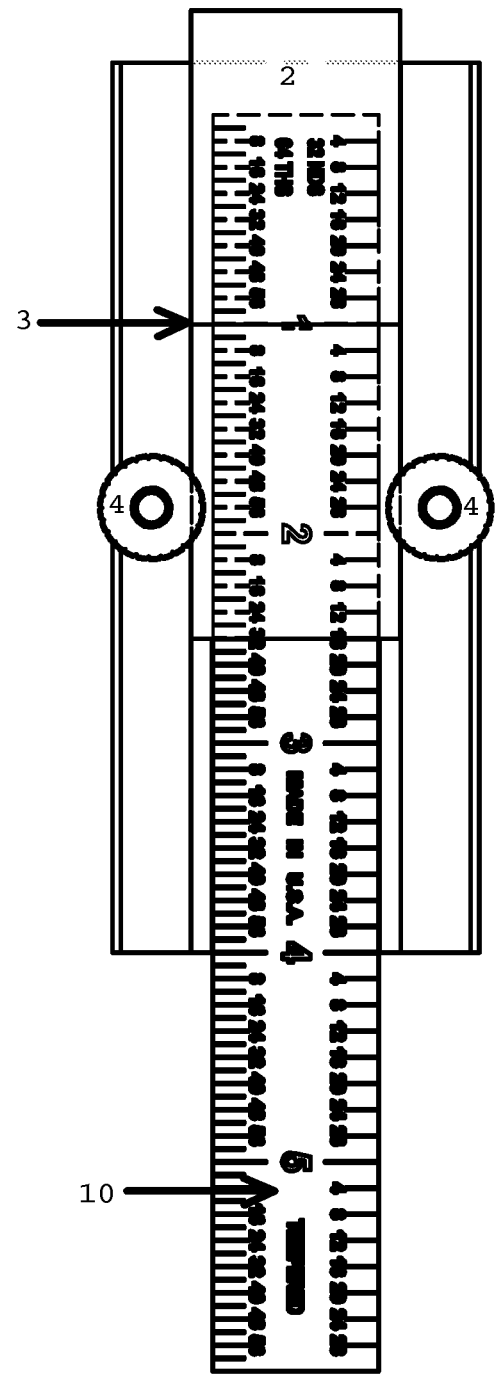
FIG. 12                    FIG. 13

TABLE SAW DEPTH GAUGE

CROSS-REFERENCE TO RELATED APPLICATIONS

This application does not claim priority to any patent application.

DISCLOSURE REGARDING PRIOR DISCLOSURES BY THE INVENTOR OR A JOINT INVENTOR

The inventor has not disclosed this invention prior to the filing of this non provisional application.

BACKGROUND OF THE INVENTION

(1) Field of the Invention

It is often difficult for the user of a table saw to set up a table saw to make accurate cut depths. Wear and tear on the table saw and the saw blade aren't compensated for when measuring table saw cuts. Typically, the user must make a test cut to ascertain the true saw blade depth. This requires several time-consuming adjustments to the saw blade and waste wood.

This device is a handheld device that fits onto the table of a table saw. The device fits within the opening of the table insert, or throat plate, of the table saw. The device includes a gauge or measuring device that reversibly moves perpendicular to the table saw to align with the depth of the saw blade and a handheld member that allows a user to position the device onto the throat plate of a table saw. This allows a user to determine the true depth the saw blade will cut upon use. This eliminates guess work and reduces bad cuts that can cause wood waste and wasted time.

(2) Disclosure of the Prior Art

A number of devices are disclosed in the prior art for forming dovetail joints where two boards are joined. Plunkett (U.S. Pat. No. 7,013,574 B2) discloses a saw blade depth gauge having a body with a blade height scale and a flexible strip capable of confirming to a perimeter of the saw blade when measuring to obtain a depth measurement on a vertical scale. Additionally, a second embodiment is disclosed in Plunkett that includes a rigid arc connected to the body by spring biased posts.

The device of Plunkett sits on top of the table saw and measures movement of the blade from the table upward, measuring the change in the vertical movement of the blade. This device is cumbersome, and difficult to use. The device is time-consuming to install and remove after use. The embodiments of Plunkett include components that contact the saw blade increasing the likelihood of user injury. Any irregularities in the table can cause measurement errors. A simple, fast, and highly accurate means of determining saw blade cutting depth is needed.

BRIEF SUMMARY OF THE INVENTION

Setting up a table saw so that the blade cutting depth can be set is a difficult and time consuming chore. Typically, a user makes a test cut on scrap material, and then adjusts the blade cutting depth by raising or lowing the saw blade. Then a user makes a second test but to confirm cutting depth at the new blade height. A means of accurately setting cutting depth without making test cuts is needed. Additionally, if a user is making several cuts of varying depth, it may be next to impossible for the user to return back to an earlier cutting depth even while using test cuts.

This device comprises a handheld measuring means that moves up and down relative to the saw blade axle allowing a user to measure saw blade cutting depth relative to the original saw blade placement. A user installs the device, takes a measurement of the position of the saw blade axle relative to the table which calibrates the device, then moves the blade the desired distance as computed by prior calibration. The device couples to the table via one or more magnets, and the measuring means stays in position within the device via one or more magnets. The device only requires one hand to install, measure and remove. The device is small and easy to position.

BRIEF DESCRIPTION OF THE DRAWINGS

The invention is described in detail below with reference to the appended drawings.

FIGS. 1 through 13 depict the Table Saw Depth Gauge. In the Figures:

FIG. 1 depicts an top, side view of the device.

FIG. 2 is an exploded angled and top view of the device. An angled side view of the of the handheld base with the magnets exploded therefrom is depicted in FIG. 3.

Figure 4:
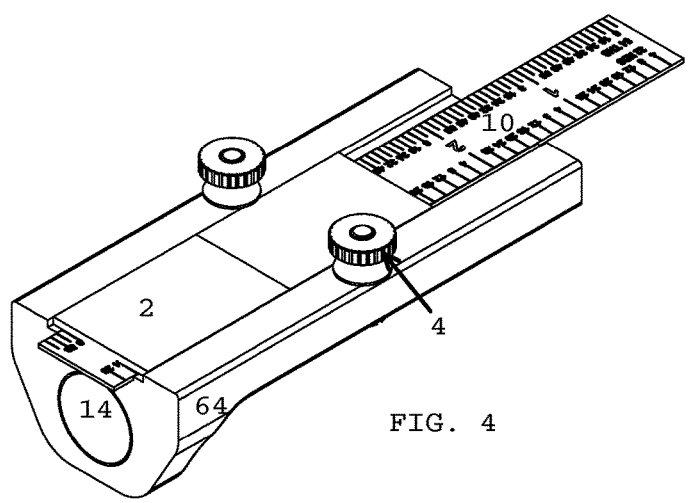
Figure 5:
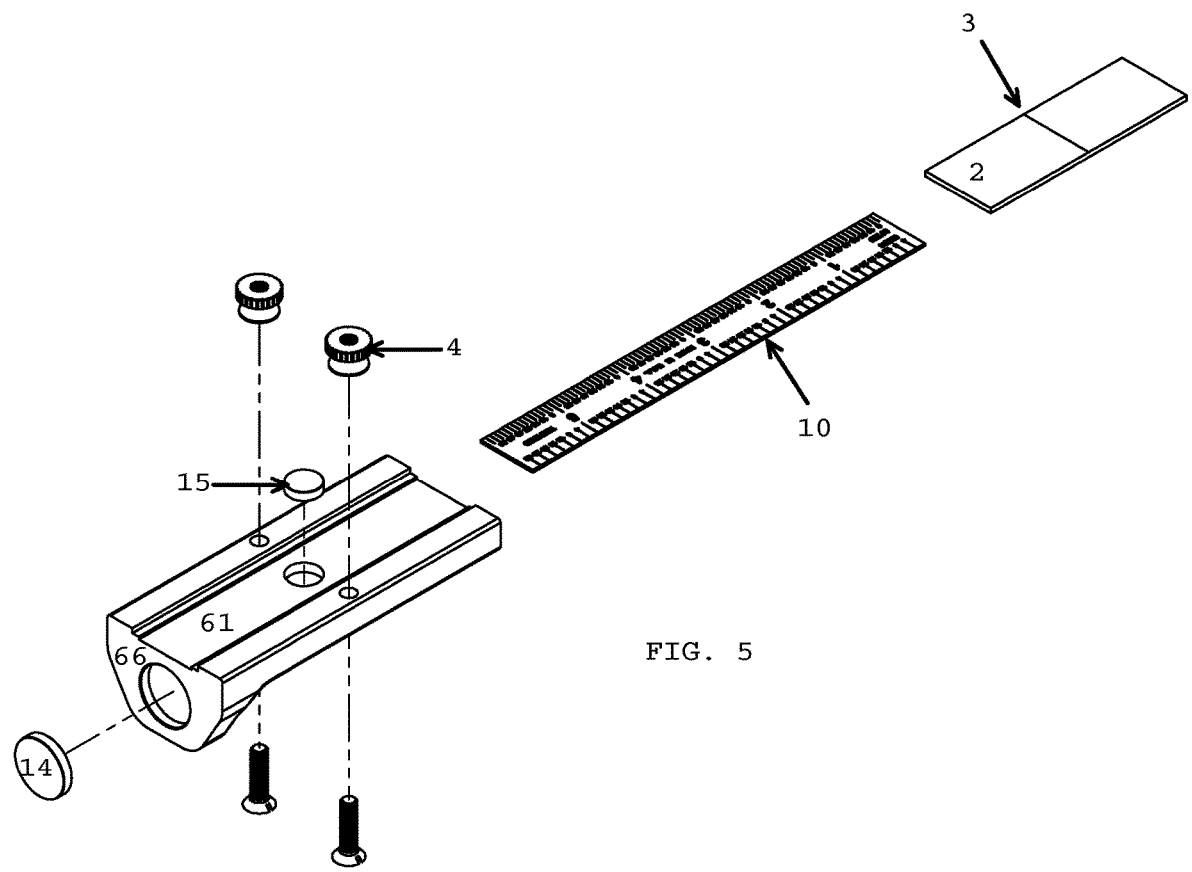

An angled side view of the an alternate embodiment of the device is shown in FIG. 4, and an exploded view of FIG. 4 is illustrated in FIG. 5.

Figure 6:
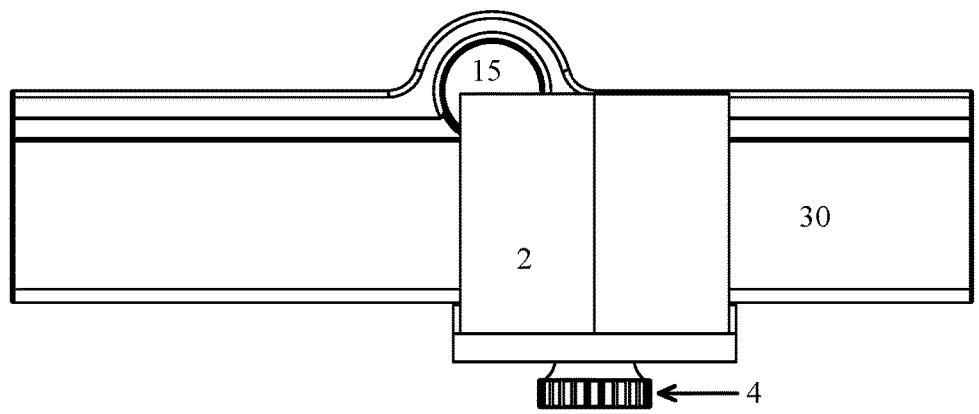
Figure 7:
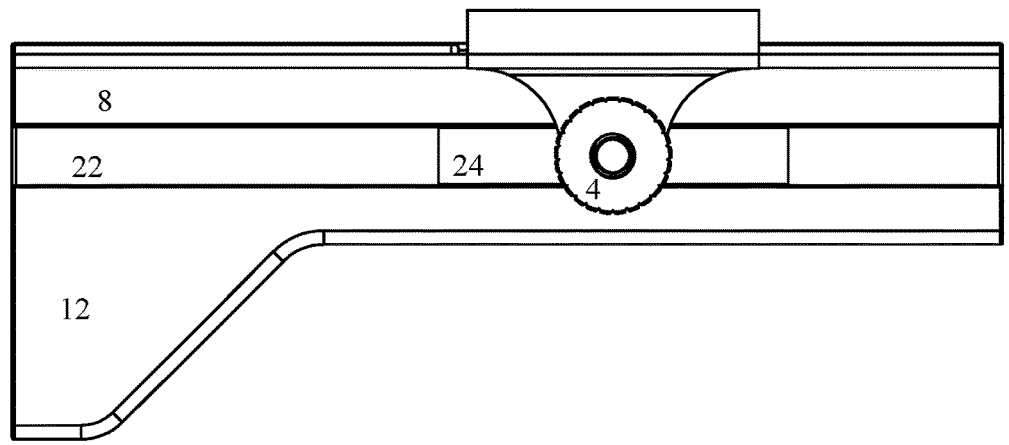
Figure 8:
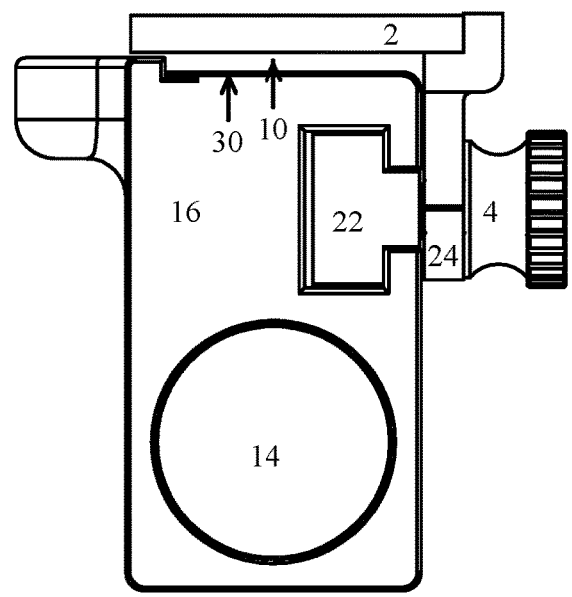

FIGS. 6, 7, and 8 illustrate a top, side and bottom view, respectively, of the device.

Figure 9:
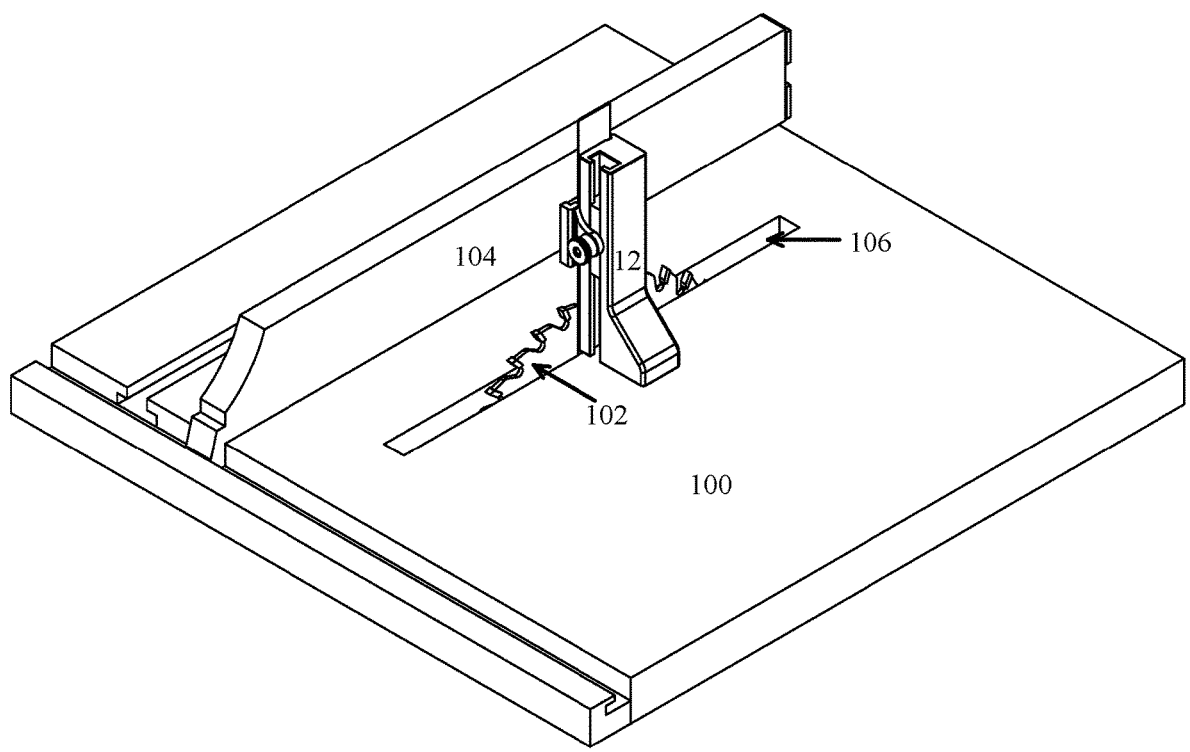

FIG. 9 shows a top, angled view of a table saw table withe the device inserted into the table insert, or throat plate.

Figure 10:
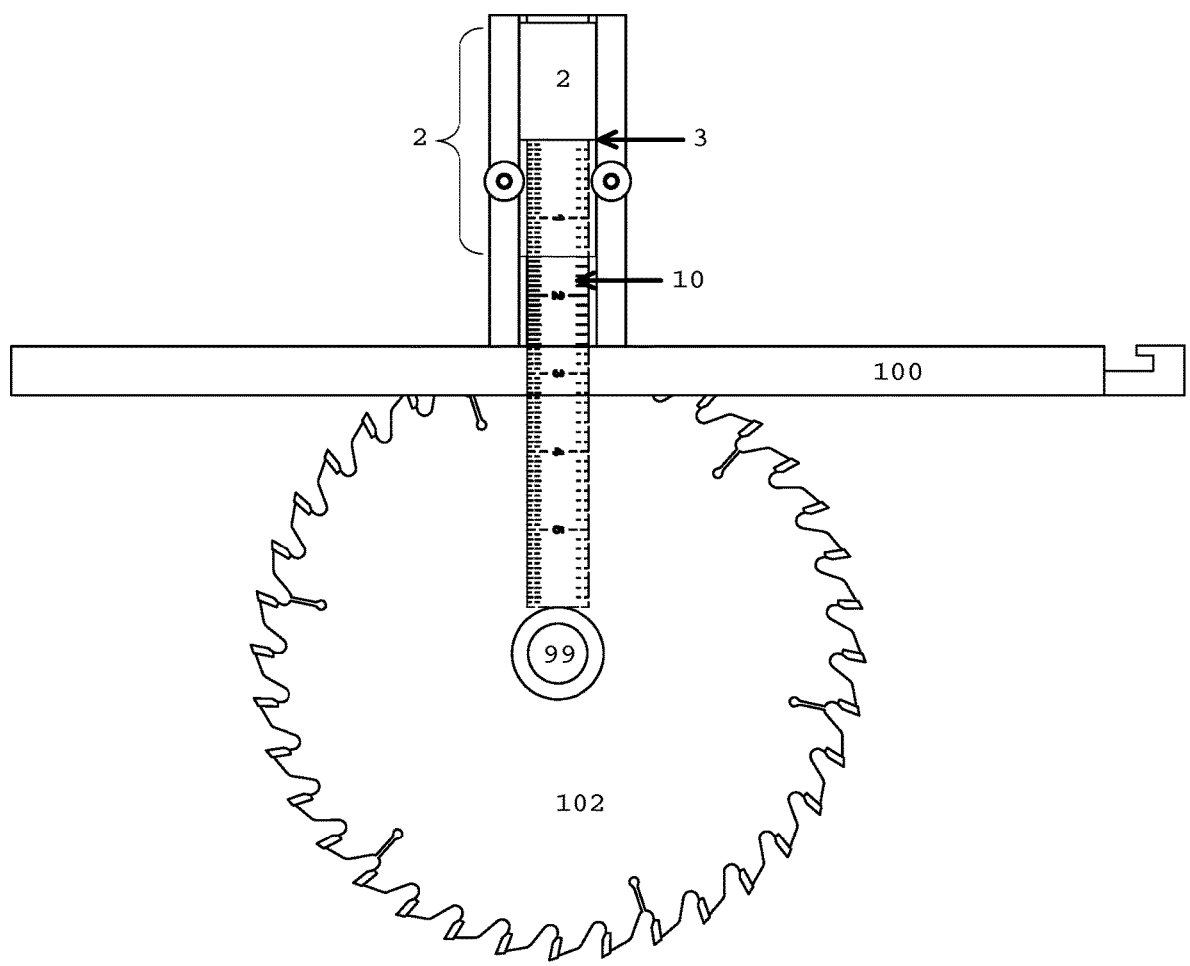
Figure 11:
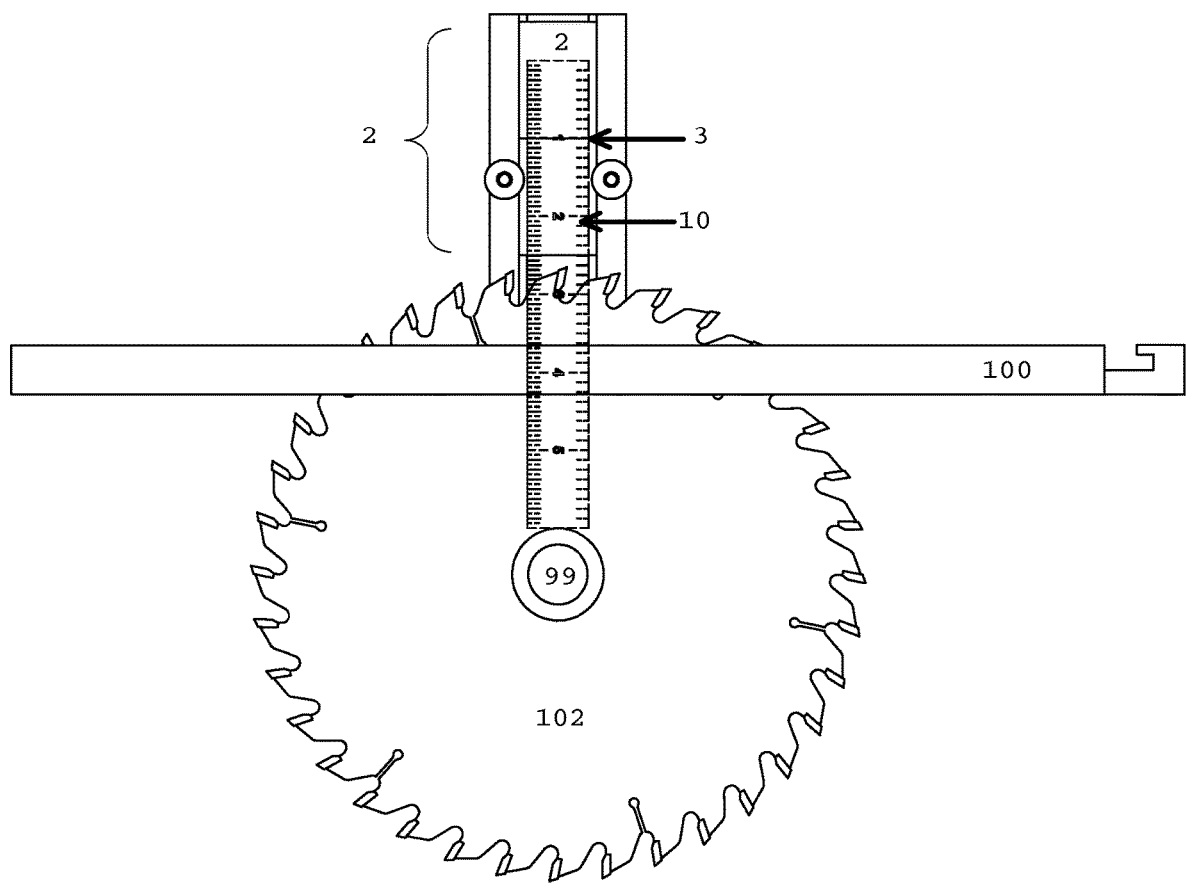

FIG. 10 depicts an alternate embodiment with the gauge, or scale, positioned against the saw blade axle to calibrate the device, while FIG. 11 depicts the saw blade repositioned to show an increased cut depth.

FIG. 12 illustrates the device with the saw blade set level with the table saw.

FIG. 13 depicts the device with the saw blade raised above the table to show cutting depth.

(g) DETAILED DESCRIPTION OF THE INVENTION

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extent that any numerical values or other specifics of materials, etc., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an embodiment in the present disclosure, can be, but not necessarily, references to the same embodiment; and, such references mean at least one of the embodiments.

Reference in this specification to "one embodiment' or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same term can be said in more than one way.

Consequently, alternative language and synonyms may be used for any one or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

Figure 1:
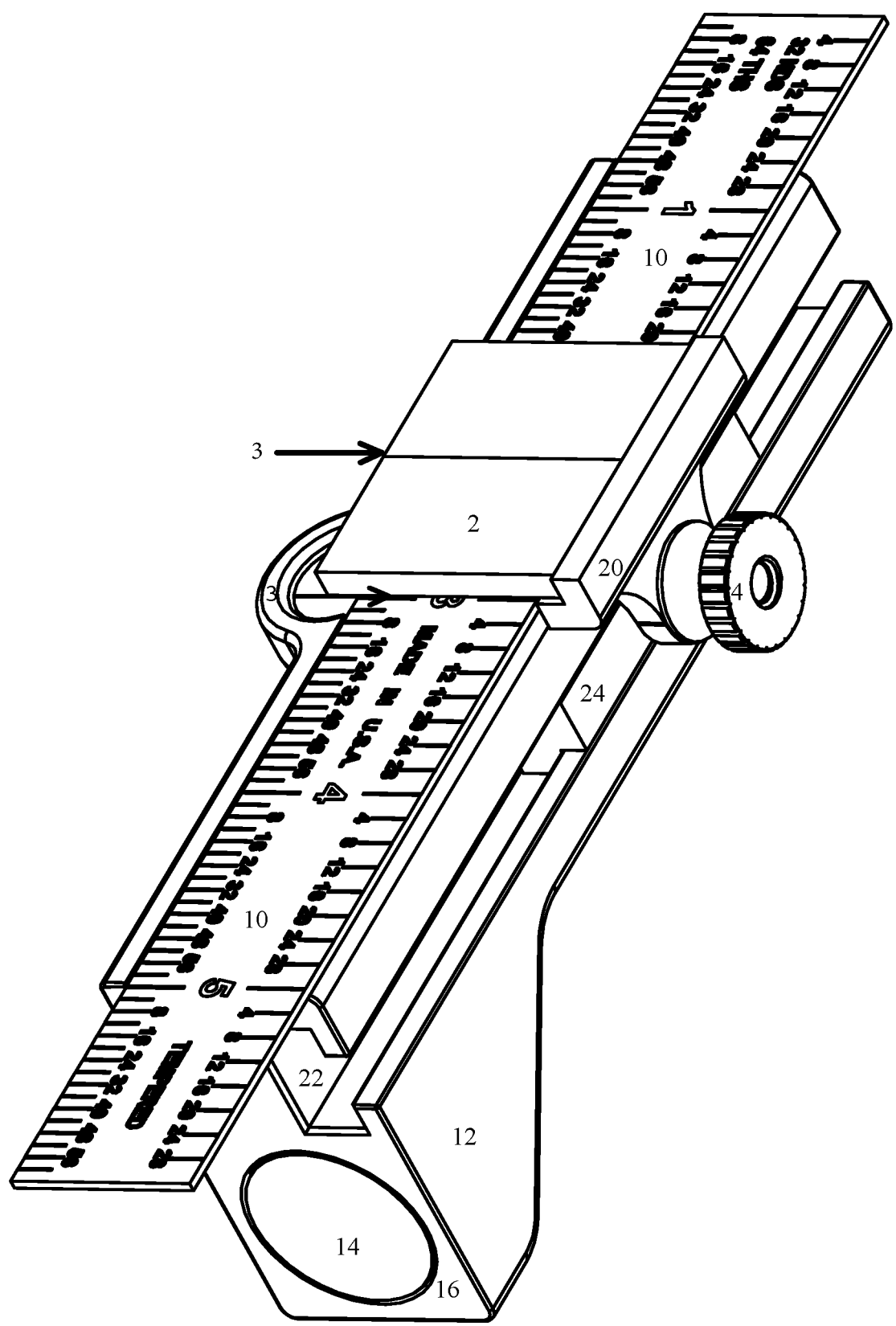
Figure 2:
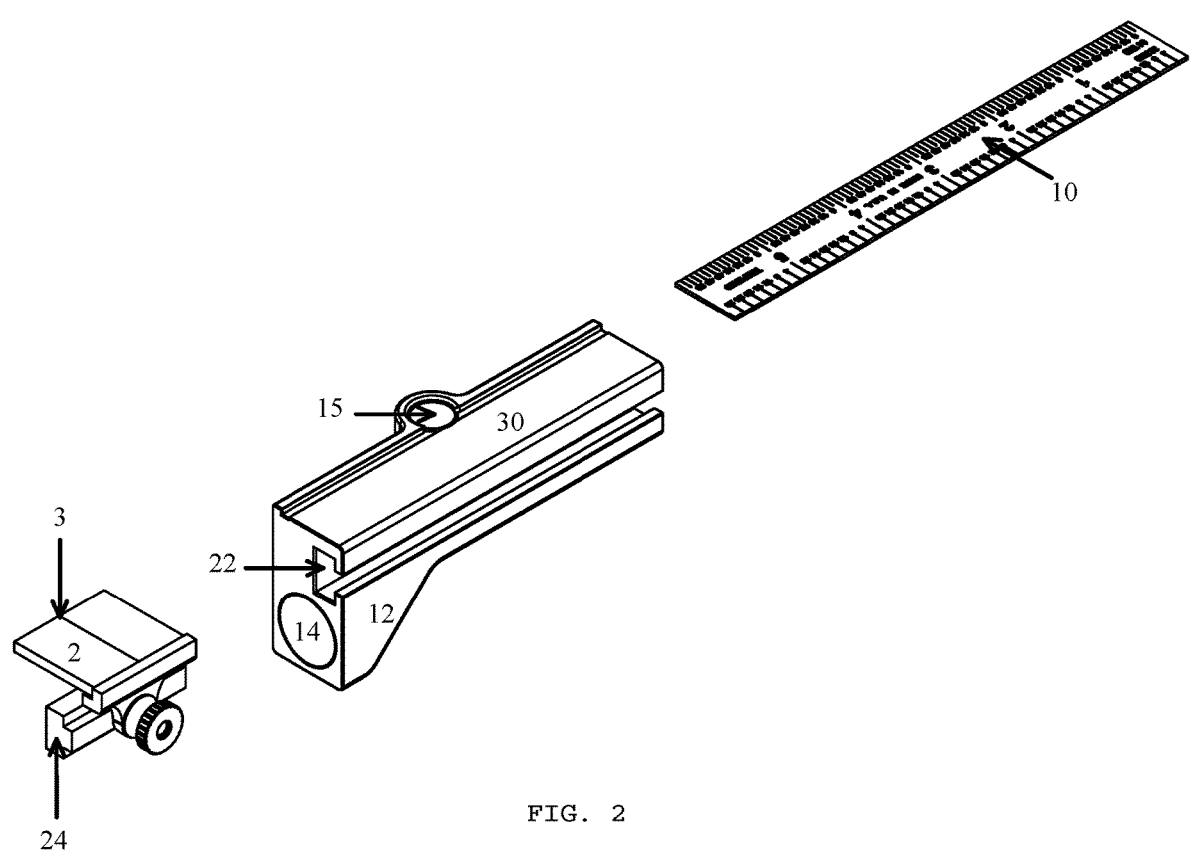

FIG. 1 depicts an top, side view of the Table Saw Depth Gauge, and FIG. 2 is an exploded angled and top view of the device. Gauge 10, or scale, may be composed of metal that is attracted to magnet 15 so that gauge 10 will bind to magnet 15 keeping gauge 10 in a stationary position while the device is in use, but allowing gauge 10 to be manipulated by a user moving relative to side panel 30. Sight 2 may be composed of a clear material so that a user can view gauge 10 while looking at sight 2. Cursor 3 may be scored onto the underside of sight 2. Cursor 3 may be a straight red line, or any other suitable color, that traverses sight 2. Base 16 may include magnet 14. Magnet 14 may allow the device to reversibly couple to the metal surface of the table insert, or throat plate, of the table saw.

Sight 2 may be formed onto sight base 24, which is formed to move up and down channel 22 when the device is positioned with magnet 14 on top of the metal surface of the table insert, or throat plate, of the table saw. A user may manipulate thumbscrew 4 in a clockwise direction tightening sight 2 onto handle 12 when sight 2 is calibrated prior to use.

Figure 3:
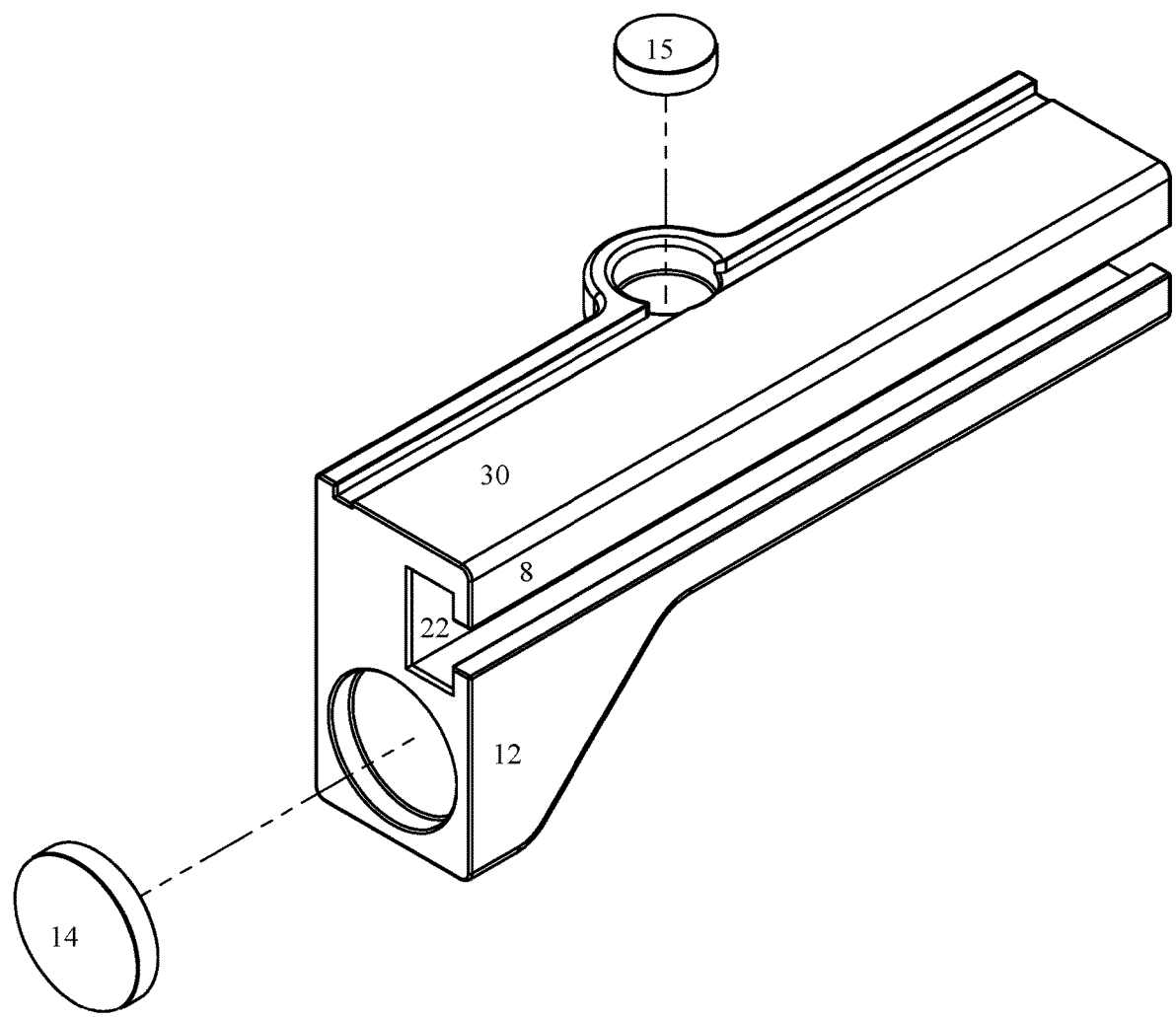

FIG. 3 depicts an angled view of the handheld member that a user positions onto the table insert or throat plate. Magnets 14 and 15 are shown removed from the handheld member. A user may reposition the handheld member by gripping handle 12. Gauge 10, or slide, moves relative to side panel 30. Sight 2 moves along the length of side panel 30 by traversing channel 22.

An alternate embodiment of the device is depicted in FIGS. 4, 5, and 10-13. This embodiment differs in that it includes two thumbscrews 4 positioned opposite each other along sight 2. Handle 64 is shaped to provide space for two thumbscrews 4. Gauge 10 moves relative to handle 64 during use. Magnet 14 allows the member to attach in a relatively fixed position when placed on the table insert, or throat plate. FIG. 5 depicts an exploded view of this embodiment. Thumbscrews 4 are exploded from handle 64, magnets 14 and 15 are exploded from handle 64, sight 2 is exploded from gauge 10 and channel 61. Gauge 10 moves linearly relative to channel 61.

FIG. 6 is a top view of the device. Sight 2 moves along the length of side panel 30 during use. Magnet 15 may maintain gauge 10 in a fixed position when not being manipulated by a user. Thumbscrew 4 allows sight 2 to be fixed into position during calibration and use. FIG. 7 is a side view of the device. Thumbscrew 4 secures sight base 24 into channel 22 of handle 12. FIG. 8 shows a bottom view of the device. Magnet 14 secures the device upright onto the table insert, or throat plate. Base 16 is positioned flush with the table insert, or throat plate. Sight 2 is shown positioned against gauge 10, which is positioned against side panel 30. Sight base 24 is secured into channel 22 via thumbscrew 4.

FIG. 9 shows the device positioned into the throat plate opening 106. Note saw blade 102 rises above the surface of table 100 in a cutting position. Handle 12 of the device is positioned perpendicular to the surface of table 100.

FIG. 10 shows a sectional view of the device during calibration. Saw blade 102 is below table 100. Gauge 10 is positioned so that it touches saw blade axle 99. Cursor 3 of sight 2 is positioned at "0" to calibrate the device. A user may then tighten both thumbscrews 4 securing cursor 3 into a fixed position while the device is calibrated at "0". Operation of the saw at this position will not make a cut in a board. FIG. 11 depicts the movement of saw blade 102 away from the surface of table 100 through the throat plate of table 100 to the desired cutting height. Cursor 3 of sight 2 remains in a fixed position while gauge 10 moves with the movement of saw blade 102 away from the surface of table 100. The cutting height can then be read on gauge 10 by viewing the movement of gauge 10 relative to the fixed position of cursor 3. The measurement ascertained on cursor 3 is the depth that saw blade 102 will cut into a board. This allows the user to determine precisely what depth he or she is cutting a board.

After a user moves saw blade 102 relative to the surface of table 100 increasing or decreasing the cutting depth of saw blade 102 into a board, then the user can easily return saw blade 102 to the prior cutting depth quickly and easily without guesswork or making test cuts.

FIGS. 12 and 13 depict a closeup view of the device shown in FIGS. 10 and 11, respectively. In FIG. 12, gauge 10 is positioned against saw blade axle 99 while saw blade 102 is aligned with the surface of the table so that saw blade 102 will not cut a board. Cursor 3 is aligned at "0" calibrating the device. In FIG. 13, the user has moved saw blade 102 1 inch away from the surface of table 100, causing gauge 10 to move 1 inch away from saw blade axle 99, creating a cutting depth of 1 inch. Once the user has completed the cut at 1 inch, then the user can quickly and easily move saw blade 102 up or down relative to table 100 wherein the user is able to measure precisely the cutting depth of saw blade 102 at each movement up or down. When the user is done, he or she can quickly and easily remove the device from the throat plate opening.

I hereby claim:

1. A guide for measuring cutting depth of a table saw comprising:
   a measuring member, or ruler, that measures the cutting depth, wherein the measuring member measures from zero to at least one positive number,
   a sight with a cursor, wherein the sight is positioned on top of the measuring member, wherein the sight is composed of a clear material allowing a user to see the measuring member while the measuring member is positioned beneath the sight, wherein the cursor may be aligned with a number formed onto a surface of the measuring member,
   a handle, wherein the measuring member is positioned on top of the handle, wherein the measuring member reversibly moves relative to the handle,
   a thumbscrew fixing the sight to the handle, wherein the measuring member reversibly moves relative to the sight, and
   a magnet formed into the handle allowing the handle to be positioned onto a table saw wherein the measuring member is perpendicular to the table saw.

2. The device of claim 1 wherein the measuring member is configured to be positioned inside an insert or throat plate of the table saw so that the measuring member touches an axle of the table saw, wherein a saw blade is coupled to the table saw via the axle.

3. The device of claim 2 wherein the cursor is positioned at "0" on the measuring means when a tip of the saw blade is flush with a surface of the table saw.

4. The device of claim 2 wherein the cursor is positioned at a position other than "0" on the measuring means when the tip of the saw blade is not flush with the surface of the table saw.

* * * * *